United States Patent
Wei et al.

(10) Patent No.: US 11,494,520 B2
(45) Date of Patent: Nov. 8, 2022

(54) RECONFIGURABLE DEVICE BITSTREAM KEY AUTHENTICATION

(71) Applicant: Intel Corporation, Santa Clara, CA (US)

(72) Inventors: Changzheng Wei, Shanghai (CN); Weigang Li, Shanghai (CN); Cunming Liang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 16/614,236

(22) PCT Filed: Jun. 16, 2017

(86) PCT No.: PCT/CN2017/088551
§ 371 (c)(1),
(2) Date: Nov. 15, 2019

(87) PCT Pub. No.: WO2018/227518
PCT Pub. Date: Dec. 20, 2018

(65) Prior Publication Data
US 2021/0012035 A1 Jan. 14, 2021

(51) Int. Cl.
*G06F 21/78* (2013.01)
*G06F 21/44* (2013.01)
(Continued)

(52) U.S. Cl.
CPC ............ *G06F 21/78* (2013.01); *G06F 21/44* (2013.01); *G06F 21/76* (2013.01); *H04L 9/0894* (2013.01)

(58) Field of Classification Search
CPC .......... G06F 21/78; G06F 21/44; G06F 21/76; H04L 9/0894
See application file for complete search history.

(56) References Cited

U.S. PATENT DOCUMENTS 6,894,527 B1 * 5/2005 Donlin .................. G06F 21/72
326/38
7,058,177 B1 * 6/2006 Trimberger .............. H04L 9/08
380/28
(Continued)

FOREIGN PATENT DOCUMENTS

CN 101854243 A 10/2010
CN 105955783 A 9/2016

OTHER PUBLICATIONS

International Search Report and Written Opinion for International Patent Application No. PCT/CN2017/08851, dated Feb. 24, 2018, 9 pages.
(Continued)

*Primary Examiner* — Yin Chen Shaw
*Assistant Examiner* — Alex D Carrasquillo
(74) *Attorney, Agent, or Firm* — Jordan IP Law, LLC

(57) ABSTRACT

An embodiment of an electronic processing system may include a processor, persistent storage media communicatively coupled to the processor, a reconfigurable device communicatively coupled to the processor over a physically isolated trusted communication channel, a secure provisioner communicatively coupled to the processor and the reconfigurable device to provision a secure storage area and to securely store a remotely generated bitstream security key in the provisioned secure storage area, and a device configurer to configure the reconfigurable device with a remotely generated bitstream and the remotely generated bitstream security key. Other embodiments are disclosed and claimed.

17 Claims, 11 Drawing Sheets

(51) Int. Cl.
*H04L 9/08* (2006.01)
*G06F 21/76* (2013.01)

(56) References Cited

U.S. PATENT DOCUMENTS

| | | | | |
|---|---|---|---|---|
| 7,191,342 | B1* | 3/2007 | New | G06F 21/76 |
| | | | | 713/165 |
| 7,366,306 | B1* | 4/2008 | Trimberger | G06F 12/1425 |
| | | | | 326/8 |
| 7,675,313 | B1* | 3/2010 | Tang | G06F 21/76 |
| | | | | 326/38 |
| 7,716,497 | B1* | 5/2010 | Trimberger | G06F 21/78 |
| | | | | 713/193 |
| 7,984,292 | B1* | 7/2011 | Streicher | H04L 9/0861 |
| | | | | 709/236 |
| 8,539,601 | B2* | 9/2013 | Richter | G06F 21/78 |
| | | | | 726/26 |
| 8,972,746 | B2* | 3/2015 | Johnson | G06F 21/645 |
| | | | | 713/189 |
| 9,311,506 | B1* | 4/2016 | Riera | G06F 21/62 |
| 2001/0015919 | A1* | 8/2001 | Kean | G06F 21/76 |
| | | | | 365/200 |
| 2002/0199110 | A1* | 12/2002 | Kean | G06F 21/76 |
| | | | | 713/189 |
| 2007/0288765 | A1* | 12/2007 | Kean | G06F 21/76 |
| | | | | 713/193 |
| 2012/0047371 | A1* | 2/2012 | Woodall | G06F 21/76 |
| | | | | 713/189 |
| 2014/0344581 | A1* | 11/2014 | Grieco | H04L 9/14 |
| | | | | 713/176 |
| 2015/0100793 | A1* | 4/2015 | Newell | H04L 9/3263 |
| | | | | 713/189 |
| 2015/0304736 | A1* | 10/2015 | Lal | H04L 9/0816 |
| | | | | 380/210 |
| 2016/0248588 | A1* | 8/2016 | Langhammer | H04L 63/0428 |
| 2016/0373416 | A1* | 12/2016 | Burger | H04L 9/3234 |
| 2017/0093572 | A1* | 3/2017 | Hunt | G06Q 20/3227 |
| 2017/0213053 | A1* | 7/2017 | Areno | G06F 21/76 |
| 2018/0211054 | A1* | 7/2018 | Costa | G06F 21/57 |
| 2018/0212760 | A1* | 7/2018 | Costa | G06F 21/57 |

OTHER PUBLICATIONS

Kyle Wilkinson, "Using Encryption to Secure a 7 Series FPGA Bitstream", XILINX All Programmable, Apr. 15, 2015, 15 pages, v. 1.0.

"Intel Software Extensions (Intel SGX)", Intel Developer Zone, software.intel.com/en-us/sgx, retrieved Apr. 13, 2017, 4 pages.

* cited by examiner

RECONFIGURABLE DEVICE BITSTREAM KEY AUTHENTICATION

CROSS REFERENCE TO RELATED APPLICATIONS

The present application is a U.S. National Phase Patent Application, which claims the benefit of priority to International Patent Application No. PCT/CN2017/088551 filed on Jun. 16, 2017.

TECHNICAL FIELD

Embodiments generally relate to reconfigurable devices. More particularly, embodiments relate to reconfigurable device bitstream key authentication.

BACKGROUND

A reconfigurable device such as a field programmable gate array (FPGA) may be reconfigured to provide different hardware functionality. In some environments, providing security around such reconfiguration may be important.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
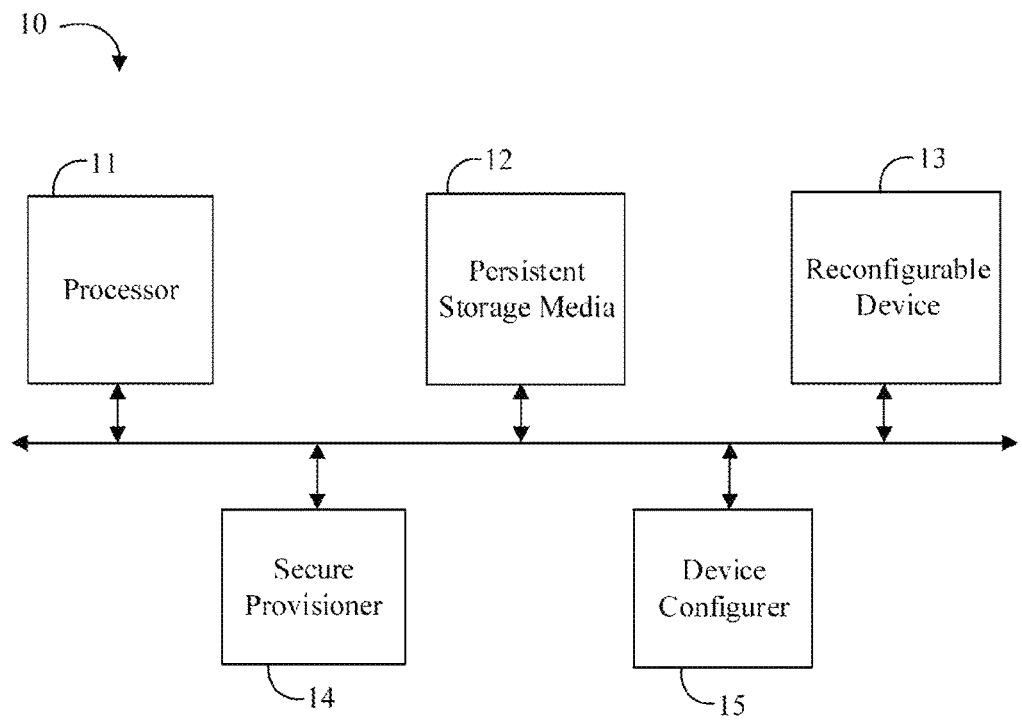
FIG. 1 is a block diagram of an example of an electronic processing system according to an embodiment.

Turning now to FIG. 1, an embodiment of an electronic processing system 10 may include a processor 11, persistent storage media 12 communicatively coupled to the processor 11, a reconfigurable device 13 communicatively coupled to the processor 11 over a physically isolated trusted communication channel, a secure provisioner 14 communicatively coupled to the processor 11 and the reconfigurable device 13 to provision a secure storage area and to securely store a remotely generated bitstream security key in the provisioned secure storage area, and a device configurer 15 to configure the reconfigurable device 13 with a remotely generated bitstream and the remotely generated bitstream security key. In some embodiments, the secure provisioner 14 may be further configured to partition an enclave for the secure storage area, associate an enclave identifier with the enclave, and provide the enclave identifier to the reconfigurable device 13 over the physically isolated trusted communication path. For example, the reconfigurable device 13 may include a FPGA device, and the remotely generated bitstream may be encoded with the enclave identifier and encrypted with the remotely generated bitstream security key.

Embodiments of each of the above processor 11, persistent storage media 12, reconfigurable device 13, secure provisioner 14, device configurer 15, and other components of the electronic processing system 10 may be implemented in hardware, software, or any suitable combination thereof. For example, hardware implementations may include configurable logic such as, for example, programmable logic arrays (PLAs), FPGAs, complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, some operational aspects of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as PYTHON, PERL, JAVA, SMALLTALK, C++, C# or the like and conventional procedural programming languages, such as the "C" programming language or similar programming languages.

In various embodiments, the system 10 may include one or more application processors and/or one or more graphics processors. The system 10 may be a single processor desktop system, a multiprocessor workstation system, or a server system having a large number of processors or processor cores. In some embodiments, the system 10 may be a processing platform incorporated within a system-on-a-chip (SoC) integrated circuit for use in mobile, handheld, wearable, or embedded devices.

Figure 2A:
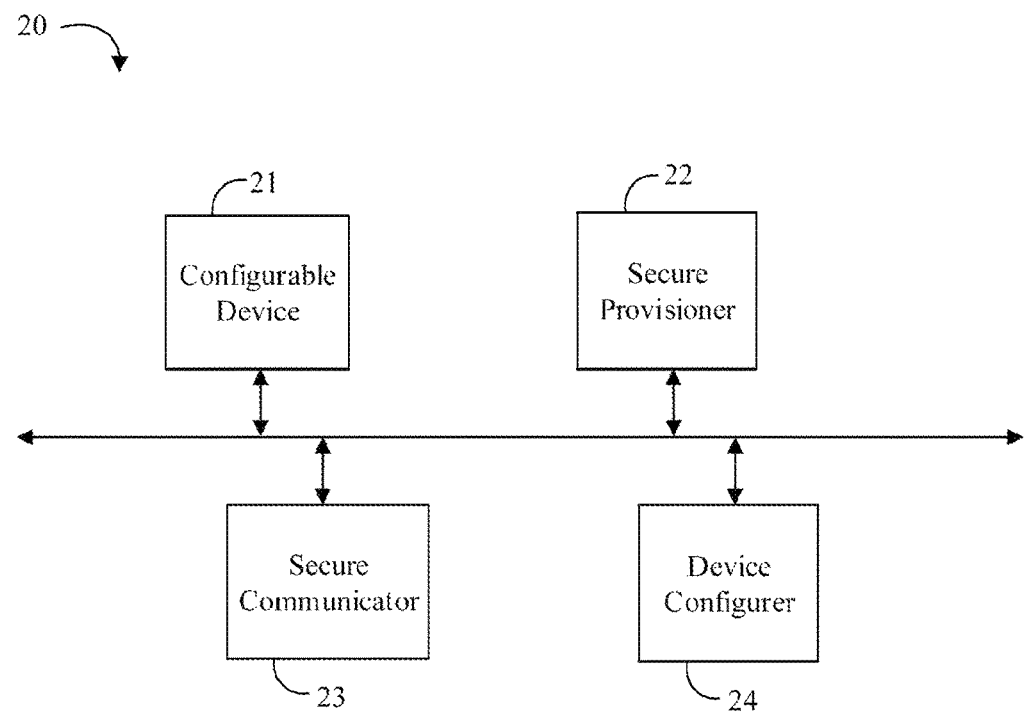
FIG. 2A is a block diagram of an example of a configurable apparatus according to an embodiment.

Turning now to FIG. 2A, an embodiment of a configurable apparatus 20 may include a configurable device 21, a secure provisioner 22 communicatively coupled to the configurable device 21 to provision a secure storage area and to securely store a remotely generated bitstream security key in the provisioned secure storage area, a secure communicator 23 communicatively coupled to the configurable device 21 and the secure provisioner 22 to establish a trusted communication path between the provisioned secure storage area and the configurable device 21, and a device configurer 24 communicatively coupled to the configurable device 21 to configure the configurable device 21 with a remotely generated bitstream and the remotely generated bitstream security key. For example, the secure provisioner 22 may be further configured to partition an enclave for the secure storage area, associate an enclave identifier with the enclave, and provide the enclave identifier to the configurable device 21 over the trusted communication path. In some embodiments, the secure communicator 23 maybe further configured to provide a physically isolated communication channel for the trusted communication path.

Figure 2B:
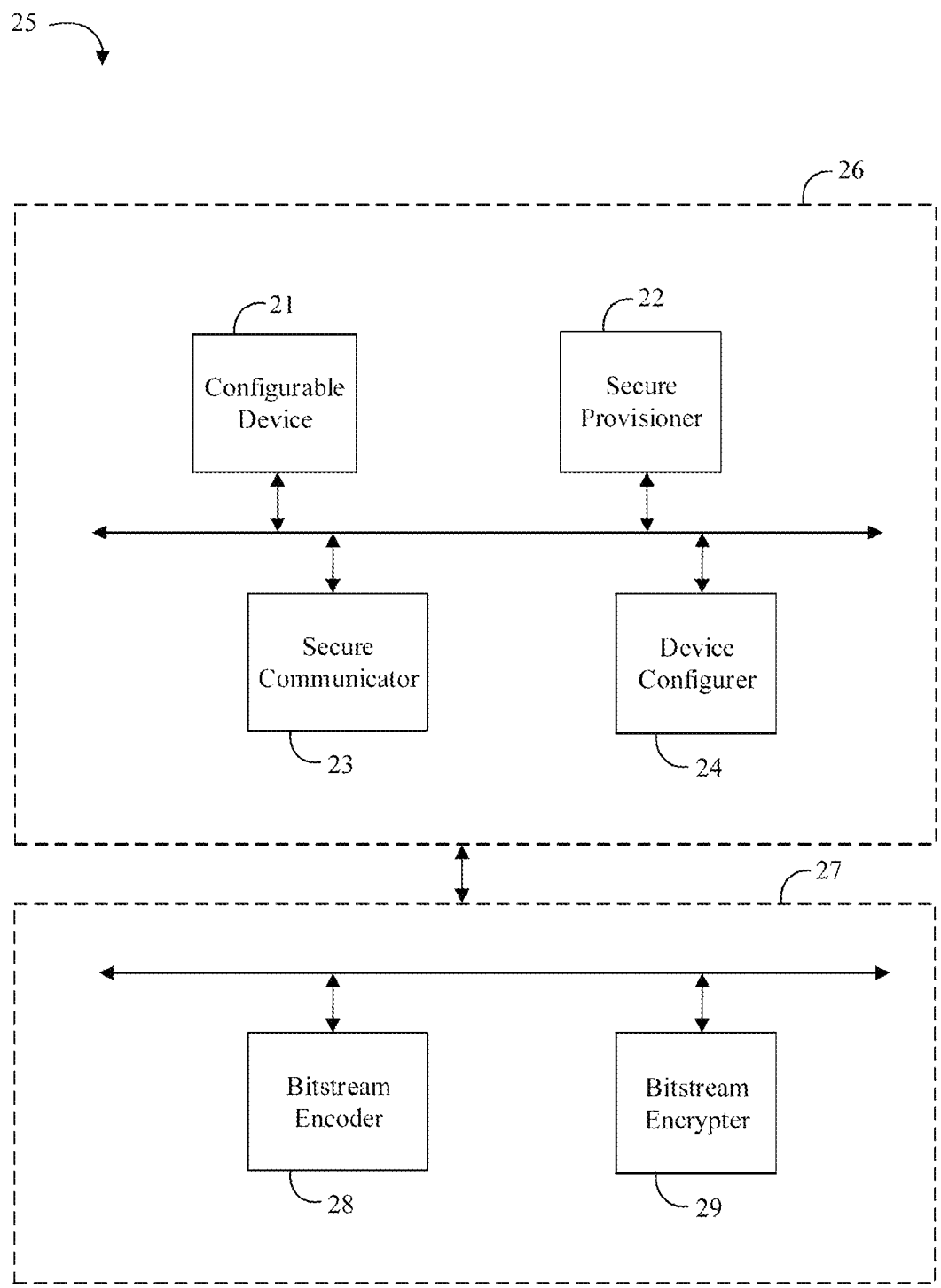
FIG. 2B is a block diagram of another example of a configurable apparatus according to an embodiment.

Turning now to FIG. 2B, an embodiment of a configurable apparatus 25 may include a target system 26 having the configurable device 21, the secure provisioner 22, the secure communicator 23, and the device configurer 24 similar to those described above with the same reference numerals. The apparatus 25 may further include a source system 27 configured to establish a secure communication channel between the source system 27 and the secure provisioner 22, to remotely generate a bitstream security key at the source system 27 for the remotely generated bitstream security key, and to provide the remotely generated bitstream security key to the secure provisioner 22 over the secure communication channel. For example, the source system 27 may further include a bitstream encoder 28 to remotely encode the bitstream with the enclave identifier at the source system 27, and a bitstream encrypter 29 to remotely encrypt the bitstream with the bitstream security key at the source system 27. In any of the embodiments herein, the configurable device 21 may include a reconfigurable device. For example, the reconfigurable device may include a FPGA device (and/or a PLA, a CPLD, etc.).

The various secure components (e.g. the secure provisioner 22, the secure communicator 23, etc.) may be instantiated in any of a variety of ways. For example, the secure components may be physically and/or logically isolated from an untrusted host. The secure components may be logically isolated, for example, through virtualization or separation techniques, such as INTEL virtualization technology (VT) or ARM TRUSTZONE. In addition, or alternatively, the secure components may be implemented on a separate, discrete piece of silicon that is not just physically isolated on the same die, but also isolated by a bus.

In some embodiments, for example, a path and/or channel may be trusted if the secure components and other components of the apparatus share a same die or package, making the path/channel less vulnerable to interposer attacks. If the secure components and other components are on separate die/package, the path/channel may be trusted if cryptographically protected. Various authentication techniques may be utilized to encrypt and sign various secure components/executables including, for example, Safe Architecture of Future Emerging (SAFE)-cryptographic algorithms, advanced encryption standard (AES) algorithms, etc.

Embodiments of each of the above configurable device 21, secure provisioner 22, secure communicator 23, device configurer 24, target system 26, source system 27, bitstream encoder 28, bitstream encrypter 29, and other components of the configurable apparatus 20, 25 may be implemented in hardware, software, or any suitable combination thereof. For example, hardware implementations may include configurable logic such as, for example, PLAs, FPGAs, CPLDs, or in fixed-functionality logic hardware using circuit technology such as, for example, ASIC, CMOS or TTL technology, or any combination thereof. Alternatively, or additionally, some operational aspects of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/ appropriate programming languages, including an object oriented programming language such as PYTHON, PERL, JAVA, SMALLTALK, C++, C# or the like and conventional procedural programming languages, such as the "C" programming language or similar programming languages.

Figure 3A:
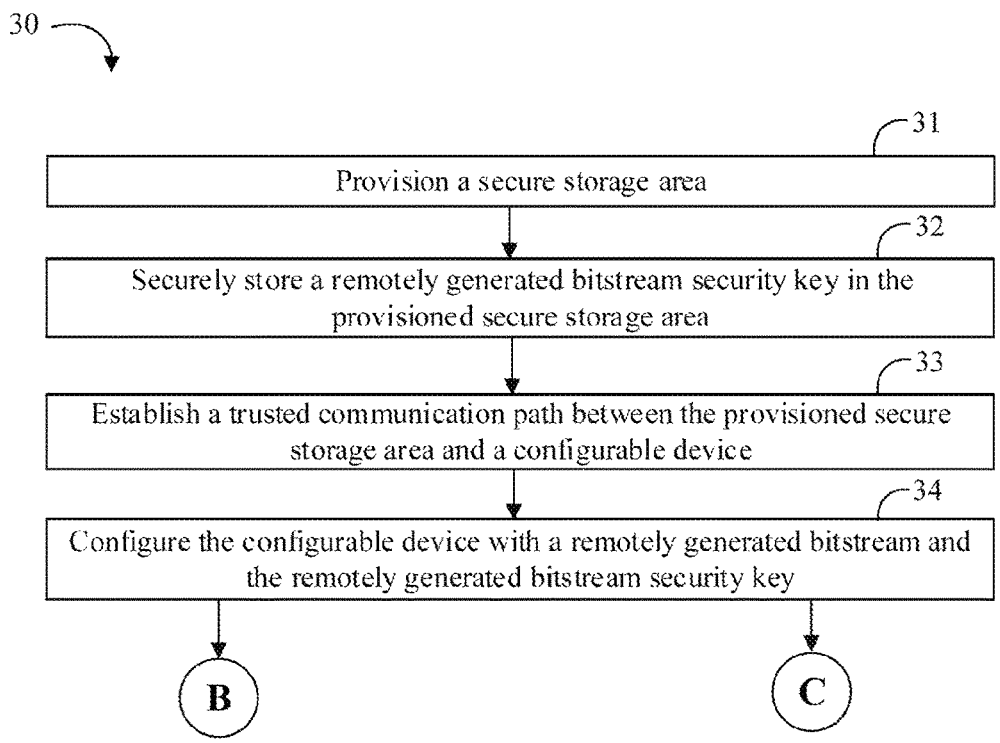
FIGS. 3A to 3C are flowcharts of an example of a method of configuring a device according to an embodiment.
Figure 3B:
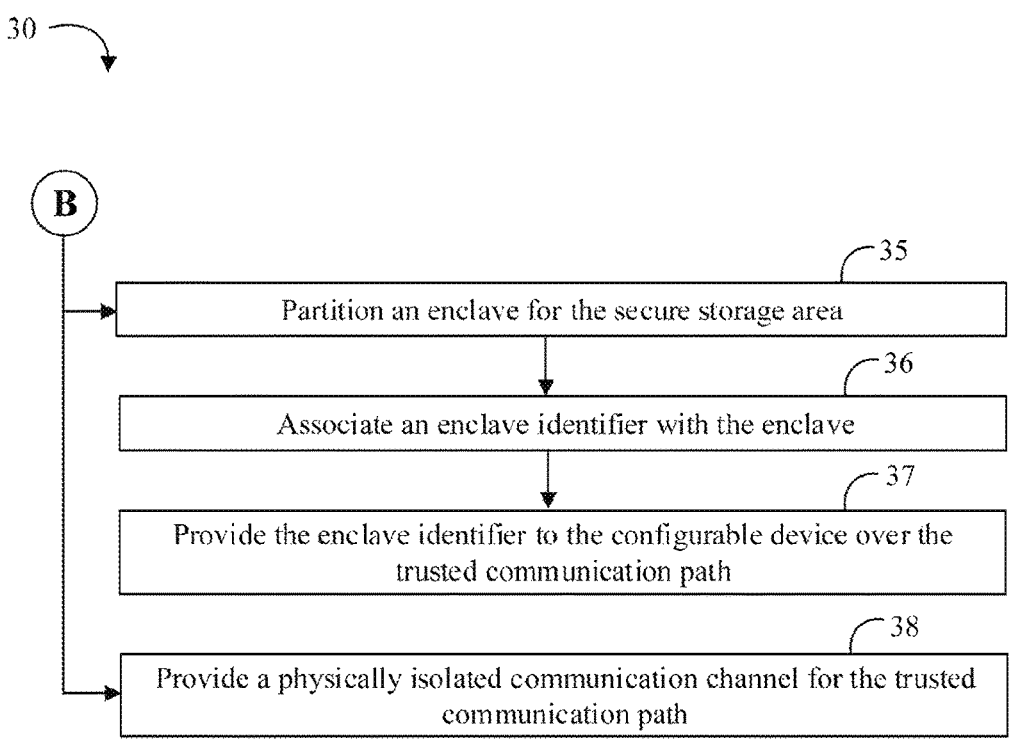
Figure 3C:
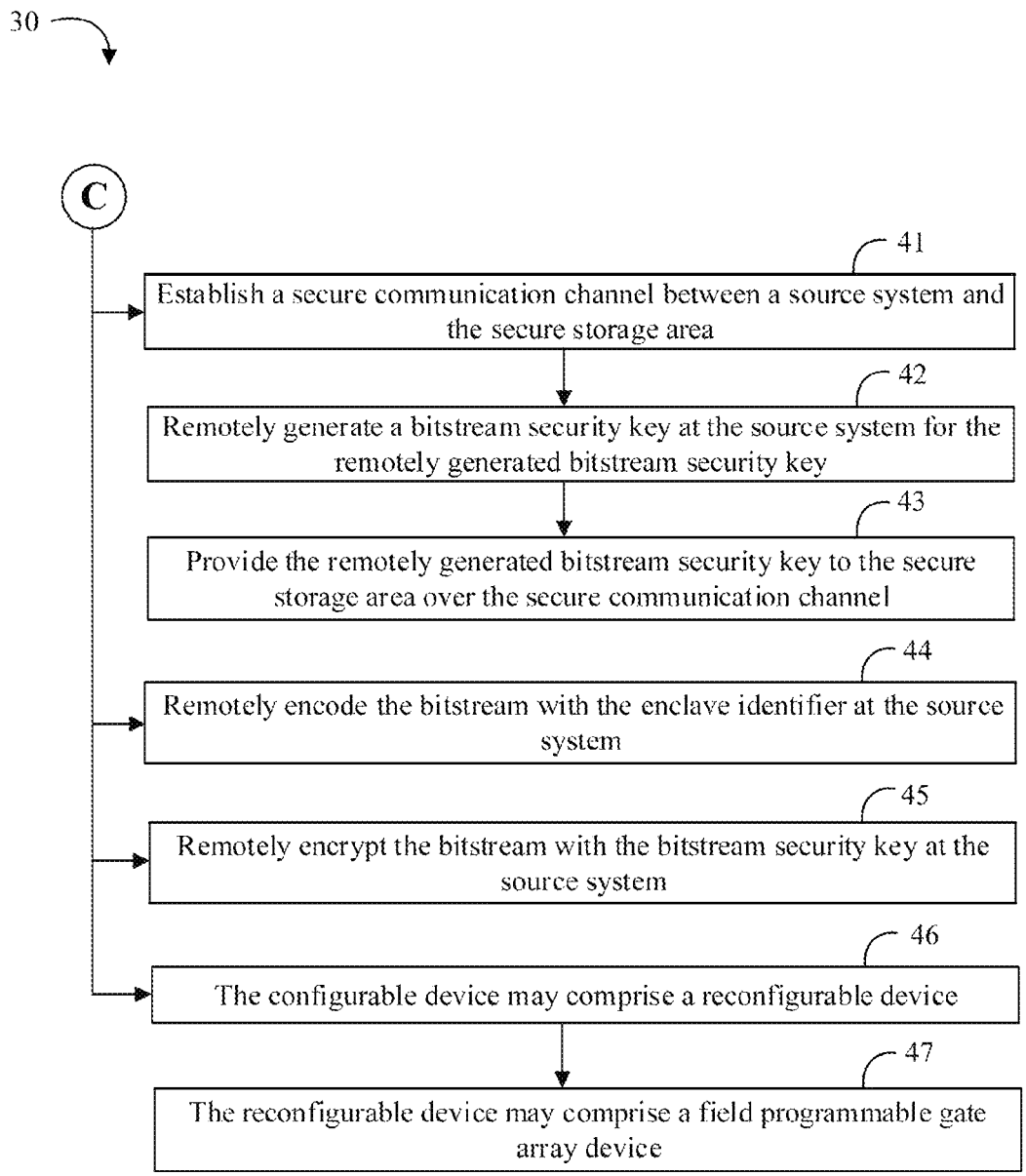

Turning now to FIGS. 3A to 3C, an embodiment of a method 30 of configuring a device may include provisioning a secure storage area at block 31, securely storing a remotely generated bitstream security key in the provisioned secure storage area at block 32, establishing a trusted communication path between the provisioned secure storage area and a configurable device at block 33, and configuring the configurable device with a remotely generated bitstream and the remotely generated bitstream security key at block 34. The method 30 may further include partitioning an enclave for the secure storage area at block 35, associating an enclave identifier with the enclave at block 36, and providing the enclave identifier to the configurable device over the trusted communication path at block 37. For example, some embodiments may also include providing a physically isolated communication channel for the trusted communication path at block 38.

Some embodiments of the method 30 may further include establishing a secure communication channel between a source system and the secure storage area at block 41, remotely generating a bitstream security key at the source system for the remotely generated bitstream security key at block 42, and providing the remotely generated bitstream security key to the secure storage area over the secure communication channel at block 43. The method 30 may also include remotely encoding the bitstream with the enclave identifier at the source system at block 44, and remotely encrypting the bitstream with the bitstream security key at the source system at block 45. In some embodiments, the configurable device may comprise a reconfigurable device at block 46. For example, the reconfigurable device may comprise a field programmable gate array device at block 47.

Embodiments of the method 30 may be implemented in an electronic processing system or a configurable apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as PYTHON, PERL, JAVA, SMALLTALK, C++ or the like and conventional procedural programming languages, such as the "C" programming language or similar programming languages. For example, embodiments of the method 30 may be implemented on a computer readable medium as described in connection with Examples 18 to 24 below.

Some embodiments may advantageously provide a method and/or apparatus for FPGA bitstream authentication key provisioning and management in the cloud. For example, a FPGA device may be useful as a generic accelerator in cloud computing. A FPGA may provide flexible customization, parallel computing excellence, and sufficient interface support. A cloud service provider may utilize a FPGA device for the next generation of cloud infrastructure, for example, by providing the FPGA computing ability as a service, sometimes referred to as FPGA-as-a-service (FaaS).

FPGA bitstream encryption may help protect the design of the FPGA from being copied, altered, or reversed engineered. Some FPGA devices may store a bitstream decryption key internally, either with dedicated RAM which may be backed up by a small externally connected battery (BBRAM), or with a fuse register which can be programmed only once (e.g. an eFUSE). This type of FPGA security may be cumbersome or impractical in a cloud computing environment where a user may need to generate or update the bitstream security key remotely and/or frequently. Moreover, because the cloud may not be a trusted environment, users may prefer to provision their key into the FPGA while reducing other security risks, such as snooping by other users or the administrators on the host side.

Advantageously, some embodiments may provide a secure FPGA service in a cloud computing environment. In particular, some embodiments may utilize either or both of two different security enhancements to configure a FPGA in a cloud computing environment. A first security enhancement according to some embodiments may include provisioning a secure memory area in the target platform and utilizing that secure memory area to exchange secure information, such as the bitstream security key. From the secure memory area, the bitstream security key may be provided to the FPGA over internal busses to inhibit snooping. Another security enhancement according to some embodiments may include generating an authentication identifier on the target platform side and providing the authentication identifier to the source system to embed in the bitstream. For example, the authentication identifier may be stored in the secure memory area to be securely accessed by the source system. The authentication identifier may also be provided to the FPGA over internal busses. The source system may then embed or encode the authentication identifier in the bitstream such that before the bitstream is decrypted, the bitstream authentication identifier may be compared against the authentication identifier stored in the FPGA to authenticate the bitstream prior to configuring the FPGA. Utilizing the authentication identifier may inhibit a faking key attack where a malicious bitstream is attempted to be substituted for the intended bitstream (e.g. because the malicious bitstream will not contain the securely exchanged authentication identifier).

Figure 4A:
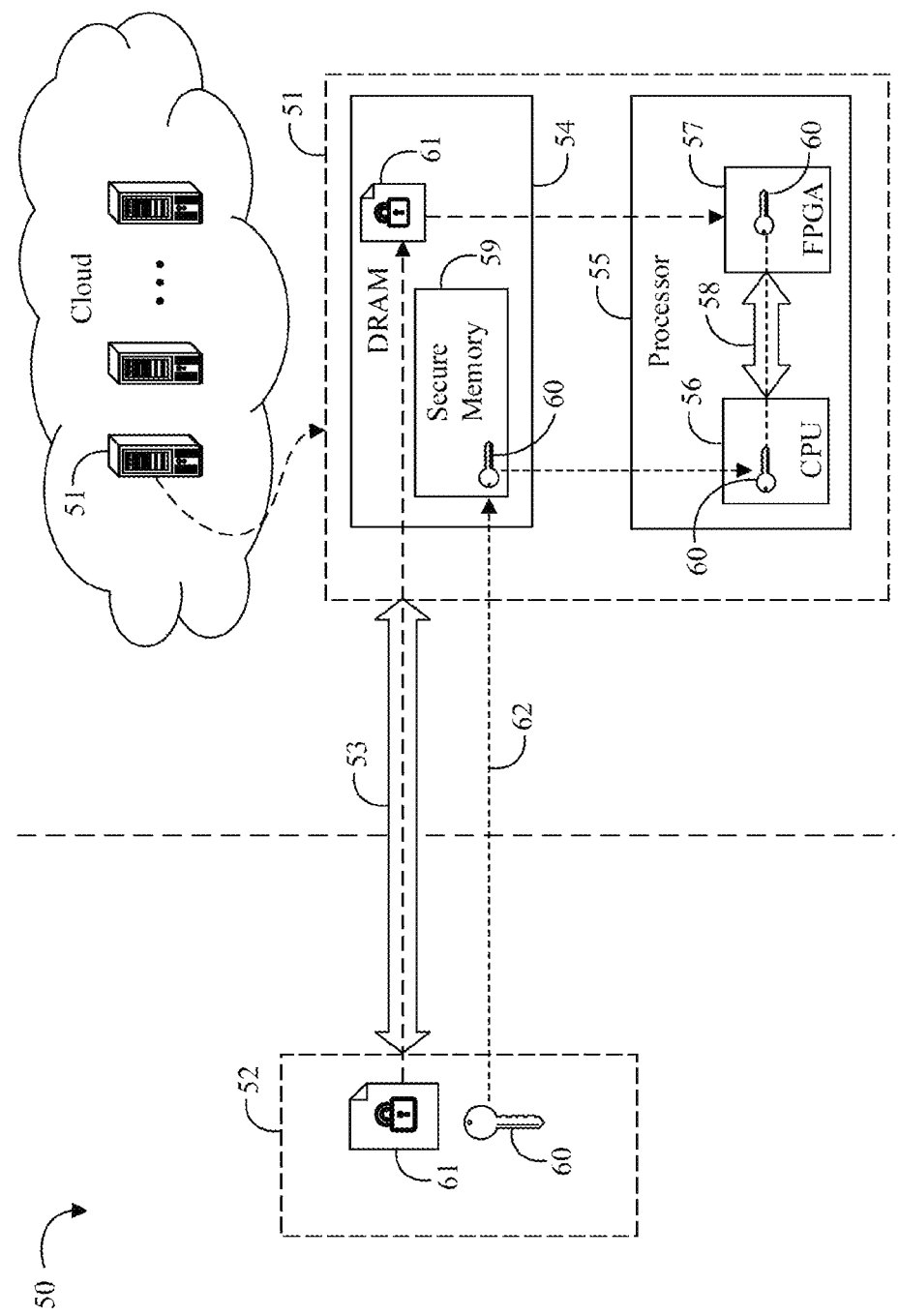
FIG. 4A is a block diagram of an example of a cloud computing environment according to an embodiment.

Turning now to FIG. 4A, a cloud computing environment 50 may include one or more servers 51 connected to a source system 52 over a network 53. The server 51 may include DRAM 54 coupled to a processor 55. The processor 55 may include a multi-chip package (MCP) housing both a central processor unit (CPU) 56 and a FPGA 57. The CPU 56 may be physically coupled to the FPGA 57 inside the MCP, such that the communication path 58 between the CPU 56 and the FPGA 57 may be difficult to probe or snoop. The server 51 may include various security features. One such security feature may include the ability to provision a secure memory area 59 in the DRAM 54 with an associated tag or identifier.

A secret bitstream security key 60 may be generated (e.g. by an end user) to encrypt a bitstream 61 at the source system 52. Before providing the bitstream 61 to the target platform (e.g. the server 51) to configure the FPGA 57, a secure channel 62 may be established over the network 53 between the source system 52 and the secure memory area 59 on the target platform. The bitstream security key 60 may then be provided from the source system 52 to the secure memory area 59 over the secure channel 62. The tag associated with the secure memory area 59 may be provided to the source system 52 over the secure channel 62. The tag may be embedded in the bitstream 61 before the bitstream 61 is encrypted with the bitstream security key 60, or added to a transmission packet which includes the encrypted bitstream 61. The encrypted bitstream 61 may then be provided to the target platform and stored in the DRAM 54.

The CPU 56 may load the key 60 from the secure memory area 59 and provide the key 60 to the FPGA 57. The CPU 56 may also provide the tag associated with the secure memory 59 to the FPGA 57. The communication path 58 may include an in-chip and/or in-package bus to provide a secure channel (e.g. it may be difficult to snoop a transaction on the bus) for the whole transaction. The secure channel and secure memory area 59 can protect the secret key 60 from any snooping attacks by malware or an administrator. The associated tag may be the same as the tag embedded in the bitstream (e.g. covered by message authentication code (MAC) but not by the cipher) and used as an authentication ID to inhibit or prevent a faking key attack and may guarantee that only the correct bitstream can be used to configure the FPGA 57. Advantageously, some embodiments may provide a secure technique for remote bitstream deployment. In accordance with some embodiments, a cloud user or a cloud operator may provision and update an FPGA bitstream and secure key remotely and securely, even if the FPGA 57 is located in an untrusted public cloud environment.

Some embodiments may advantageously provide flexible and secure key provisioning for a heterogeneous CPU and FPGA platform in a cloud computing environment. For example, various cloud computing environments may utilize heterogeneous processors such as an INTEL XEON+FPGA MCP which packages a CPU and a FPGA in a same socket. This package may be advantageously used to setup a secure channel between the CPU and the FPGA inside the physical socket. For example, the CPU may be coupled to the FPGA by a bus utilizing the INTEL QUICKPATH INTERCONNECT (QPI) point-to-point processor interconnect.

Some embodiments may further utilize INTEL SOFTWARE GUARD EXTENSIONS (SGX) technology to support a remote secure key provisioning technique for such a heterogeneous platform and to provide a scalable/flexible key provisioning technique for a cloud computing environment. SGX may protect selected code and data from disclosure or modification. A developer may partition an application into CPU-hardened enclaves (e.g. protected areas of execution that may increase security even on compromised platforms). SGX may provide a secure remote attestation feature which allows a developer to challenge the remote enclave and provision secret information securely into a remote target system. SGX may be well suited to provide a secure memory area for the remote target system, which some embodiments may utilize to exchange the bitstream security key and/or the authentication identifier. In some embodiments, the in-socket bus may provide a trusted CPU-to-FPGA secure channel and a tag associated with the SGX memory transaction may help to identify the secure context (e.g. the partitioned enclave).

In some embodiments, the bitstream security key may be saved in an SGX enclave (e.g. encrypted in memory) and pushed to FPGA via the physical secure internal in-socket bus. An enclave identifier may be associated with the SGX enclave and provided to the end user to embed in the bitstream. The bitstream may be MAC authenticated and its secure key may be pushed across the internal bus by the bus transaction with the enclave identifier to further authenticate the identity of the bitstream. Then only the authenticated bitstream may be decrypted by the correct authenticated secure key in the FPGA. All or most of these transactions may securely happen inside a trusted area including the SGX enclave and the CPU and FPGA socket. Advantageously, the system administrator or other malicious users are inhibited or prevented from snooping and hacking the process.

Figure 4B:
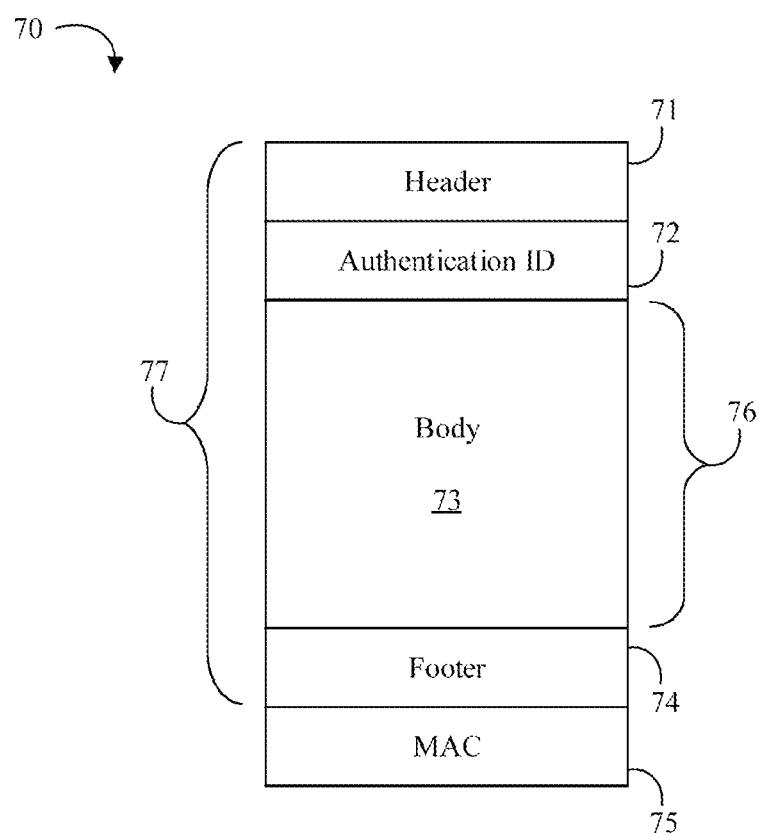
FIG. 4B is an illustrative diagram of an example of a bitstream according to an embodiment.

Turning now to FIG. 4B, an embodiment of an illustrative structure for a bitstream 70 may include a header 71, followed by an authentication identifier (ID) 72, followed by a body portion 73, followed by a footer 74 and a message authentication code (MAC) 75. A first portion 76 of the bitstream 70 may be encrypted. For example, the body portion 73 of the bitstream 70 may be encrypted with the bitstream security key. In some embodiments, the encrypted first portion 76 may include other portions of the bitstream 70, including the header 71, authentication ID 72, footer 74, etc. A second portion 77 of the bitstream 70 may be authenticated. For example, the header 71, authentication ID 72, body portion 73, and footer 74 may be authenticated by a code in the MAC 75 portion of the bitstream 70.

An end user may generate the bitstream security key to encrypt the bitstream 70. The end user may also insert a hash value of an SGX enclave identifier (e.g. which is provided from the target platform) into or after the header 71 of the bitstream 70 as the authentication ID 72. On the target platform, when the CPU loads the SGX enclave, the CPU may determine the hash value of the SGX enclave identifier and store the hash value into a CPU register which is read only for software. Subsequently, the hash value may be used as a secure memory associated tag and compared to the authentication ID 72 in the bitstream 70 to identify which SGX enclave holds the bitstream security key for the bitstream 70.

Figure 4C:
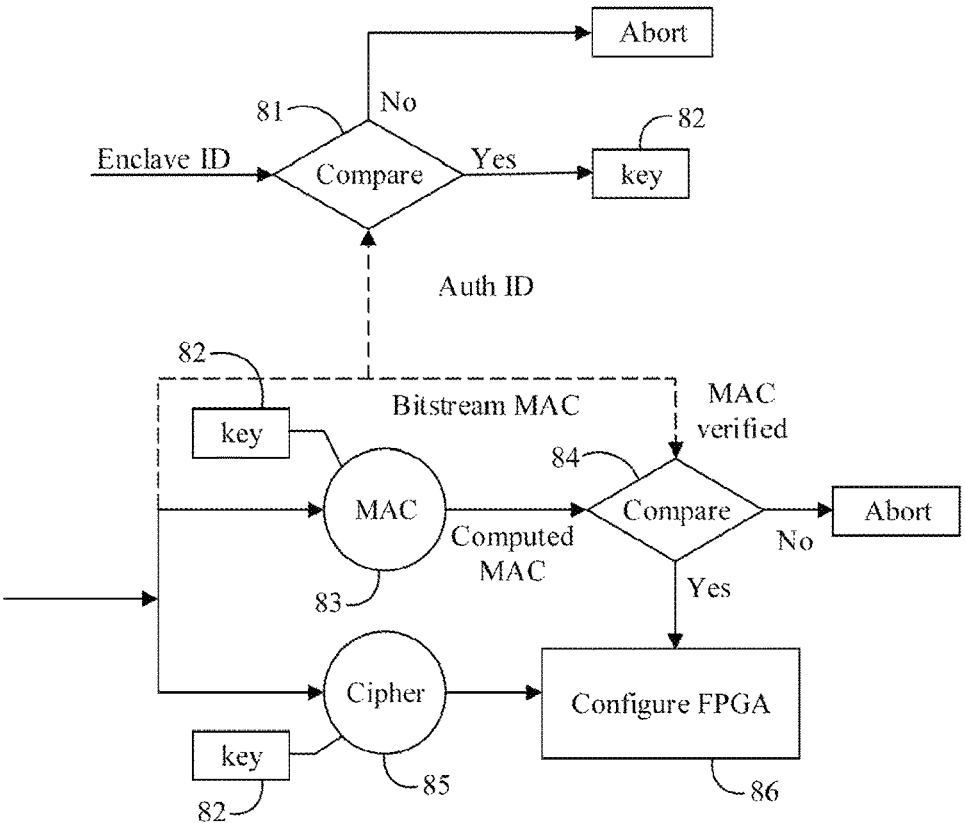
FIG. 4C is a flowchart of an example of a method of configuring a FPGA according to an embodiment.

Turning now to FIG. 4C, a method 80 of configuring a FPGA may include preliminary setup between a development environment and a target platform as described above. For example, a user may setup a secure channel with an SGX enclave running on the target platform and push a bitstream security key into the target SGX enclave via the secure channel. In the target platform, the SGX enclave code may import the bitstream security key securely into the CPU. The CPU may push the key to the FPGA via an internal hardware connection such as a QPI bus. Along with the key push instruction, the CPU may provide a secure memory associated tag to the FPGA which may be the hash value of the SGX enclave identifier determined by the CPU when the SGX enclave is partitioned. This hash value may be also independently calculated by the user offline in the development environment and embedded into an authentication ID of the bitstream before providing the encrypted bitstream to the target platform. When the CPU of the target platform loads the SGX enclave it may re-calculate a current hash value of the SGX enclave identifier and store it into an SGX ENCLAVE CONTROL STRUCTURE (SECS) which cannot be accessed by software.

The CPU may load the encrypted bitstream (e.g. using a software developer kit (SDK) tool) and extract authentication ID from the bitstream (e.g. the hash value of the SGX enclave identifier). At block 81, the FPGA may check if the SGX enclave identifier pushed into the FPGA by the CPU matches with the authentication ID extracted from the bitstream. If the check passed at block 81, the bitstream security key may be provisioned in the key register temporarily at block 82. Otherwise, the reconfiguration of the FPGA may be aborted.

If the reconfiguration is not aborted at block 81, the FPGA may use the key to authenticate the MAC value of the bitstream at block 83 and verify the computed MAC value at block 84. If the MAC is verified successfully, then the key is valid. Otherwise, the reconfiguration of the FPGA may be aborted. If the reconfiguration is not aborted at block 84, the FPGA may decrypt the bitstream with the key at block 85 and download the decrypted bitstream into FPGA logic at block 86.

Figure 5A:
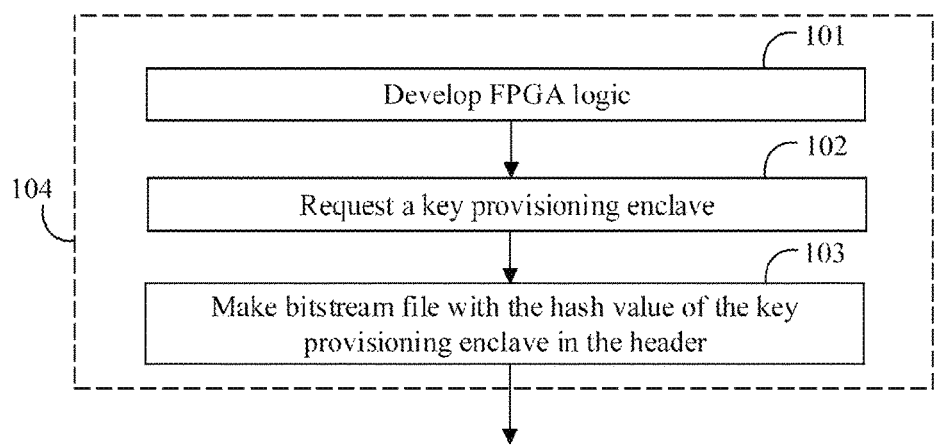
FIG. 5A is a flowchart of an example of a method of preparing a secure FPGA bitstream according to an embodiment.

Turning now to FIG. 5A, an embodiment of a method 100 of preparing a bitstream may include developing FPGA logic at block 101, requesting a key provisioning enclave at block 102, and making a bitstream file with a hash value of the key provisioning enclave in the header at block 103. For example, each of blocks 101, 102, and 103 may occur in a development environment 104.

Figure 5B:
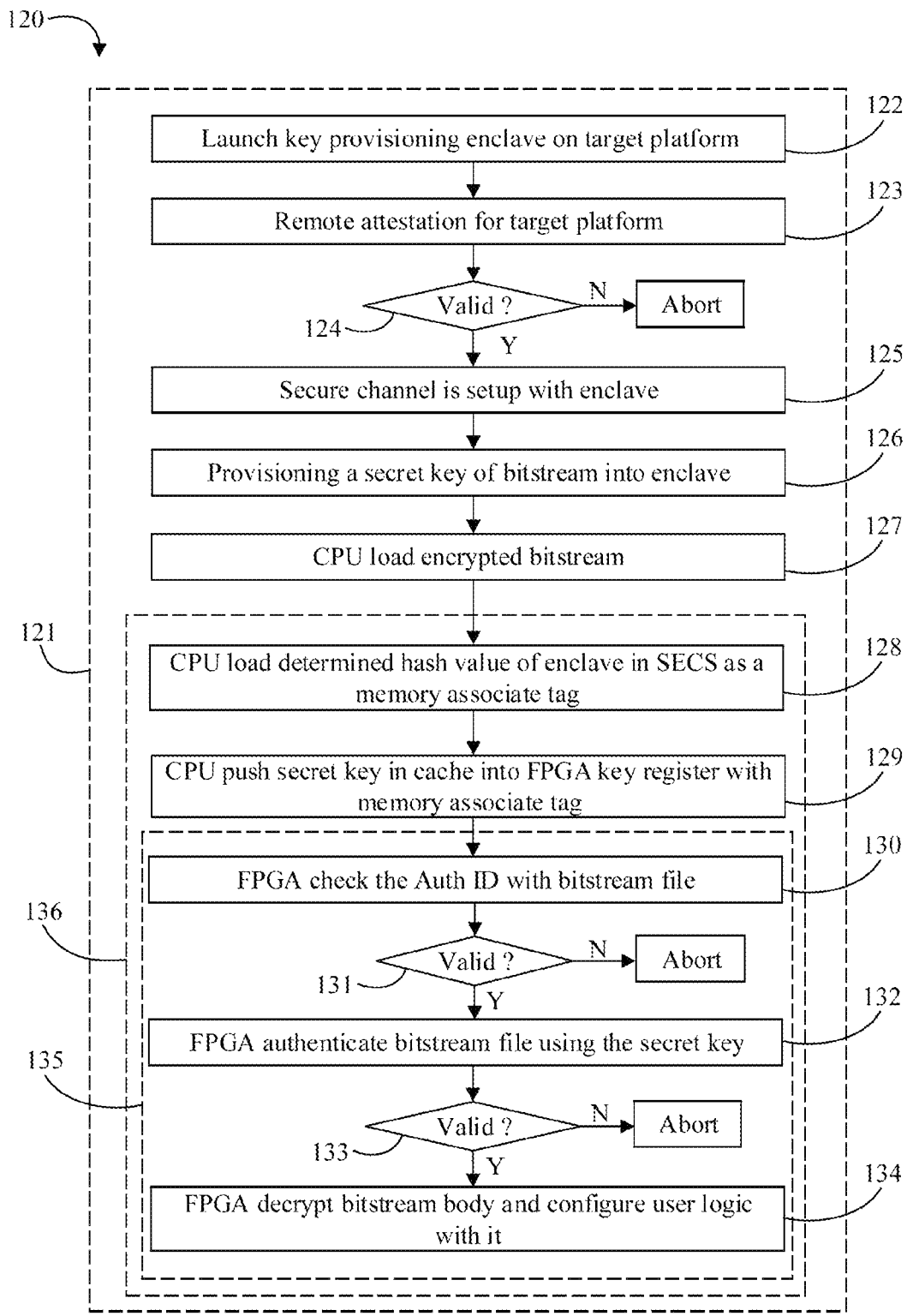
FIG. 5B is a flowchart of an example of a method of securely configuring a FPGA according to an embodiment.

Turning now to FIG. 5B, an embodiment of a method 120 of configuring a device may include launching a key provisioning enclave on a target platform 121 at block 122 and remotely attesting for the target platform 121 at block 123. If the attestation is not valid at block 124, the reconfiguration may be aborted. If the attestation is valid at block 124, the method 120 may proceed to setup a secure channel between the enclave and the remote development environment at block 125, provision a secret key of the bitstream into the enclave at block 126, and the CPU may load the encrypted bitstream onto the target platform at block 127.

The CPU may then load a determined hash value corresponding to the enclave in the SECS as a secure memory associated tag at block 128, and push the secret bitstream key into an FPGA key register along with the associated secure memory tag at block 129. The FPGA may compare an authentication ID from the bitstream against the tag at block 130. If the comparison is not valid at block 131, the reconfiguration may be aborted. If the comparison is valid at block 131, the FPGA may authenticate the bitstream using the secret key at block 132. If the authentication is not valid at block 133, the reconfiguration may be aborted. If the authentication is valid at block 133, the FPGA may decrypt the bitstream body and configure the user logic with the decrypted bitstream at block 134. For example, blocks 130 through 134 may all occur inside an FPGA 135, and blocks 128 through 134 may all occur inside a processor package 136.

Figure 6:
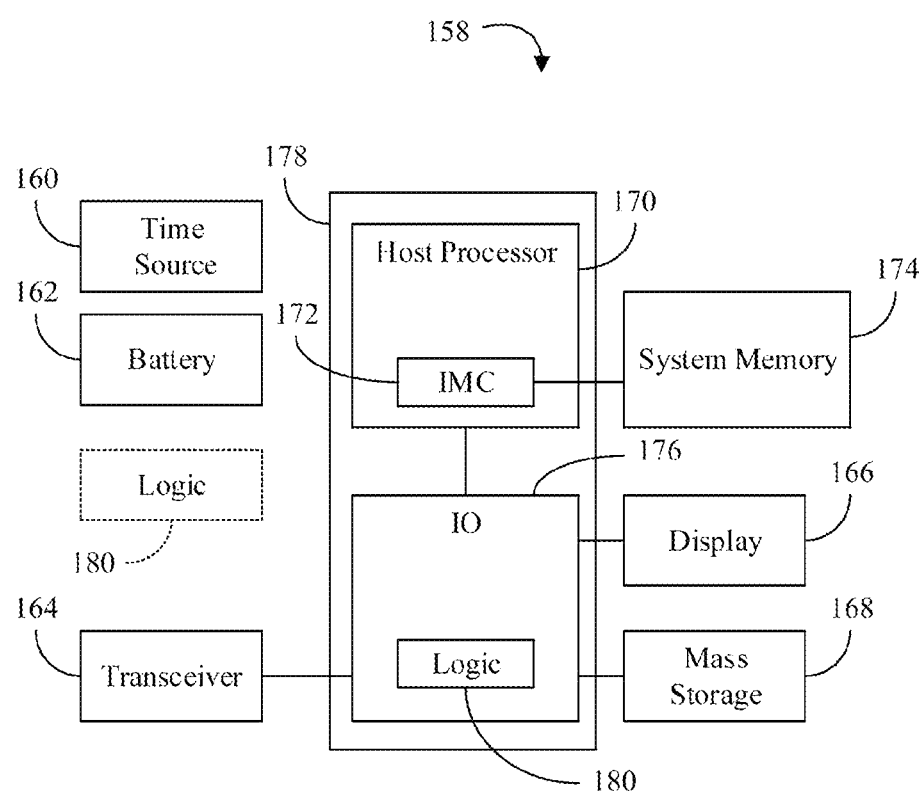
FIG. 6 is a block diagram of an example of a computing device according to an embodiment.

FIG. 6 shows a computing device 158 that may be readily substituted for one or more components of the various systems, apparatuses, platforms, and/or environments, already discussed. In the illustrated example, the device 158 includes a time source 160 crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (JO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The computing device 158 may include logic 180 that causes the semiconductor die 178 to operate as a configurable device such as the various embodiments described herein. Thus, the logic 180 may cause the computing device 158 to provision a secure storage area, securely store a remotely generated bitstream security key in the provisioned secure storage area, establish a trusted communication path between the provisioned secure storage area and a configurable device, and configure the configurable device with a remotely generated bitstream and the remotely generated bitstream security key. The logic 180 may further cause the computing device 158 to partition an enclave for the secure storage area, associate an enclave identifier with the enclave, and provide the enclave identifier to the configurable device over the trusted communication path. For example, in some embodiments the logic 180 may also cause the computing device 158 to provide a physically isolated communication channel for the trusted communication path.

Moreover, the logic 180 may also cause the computing device 158 to establish a secure communication channel between a source system and the secure storage area, remotely generate a bitstream security key at the source system for the remotely generated bitstream security key, and provide the remotely generated bitstream security key to the secure storage area over the secure communication channel. The logic 180 may also cause the computing device 158 to remotely encode the bitstream with the enclave identifier at the source system, and remotely encrypt the bitstream with the bitstream security key at the source system. In some embodiments, the configurable device may comprise a reconfigurable device. For example, the reconfigurable device may comprise a FPGA. In one example, the time source 160 is autonomous/independent from the controller in order to enhance security (e.g., to prevent the controller from tampering with cadence, frequency, latency and/or timestamp data). The logic 180 may also be implemented separately from the computing device 158.

Figure 7:
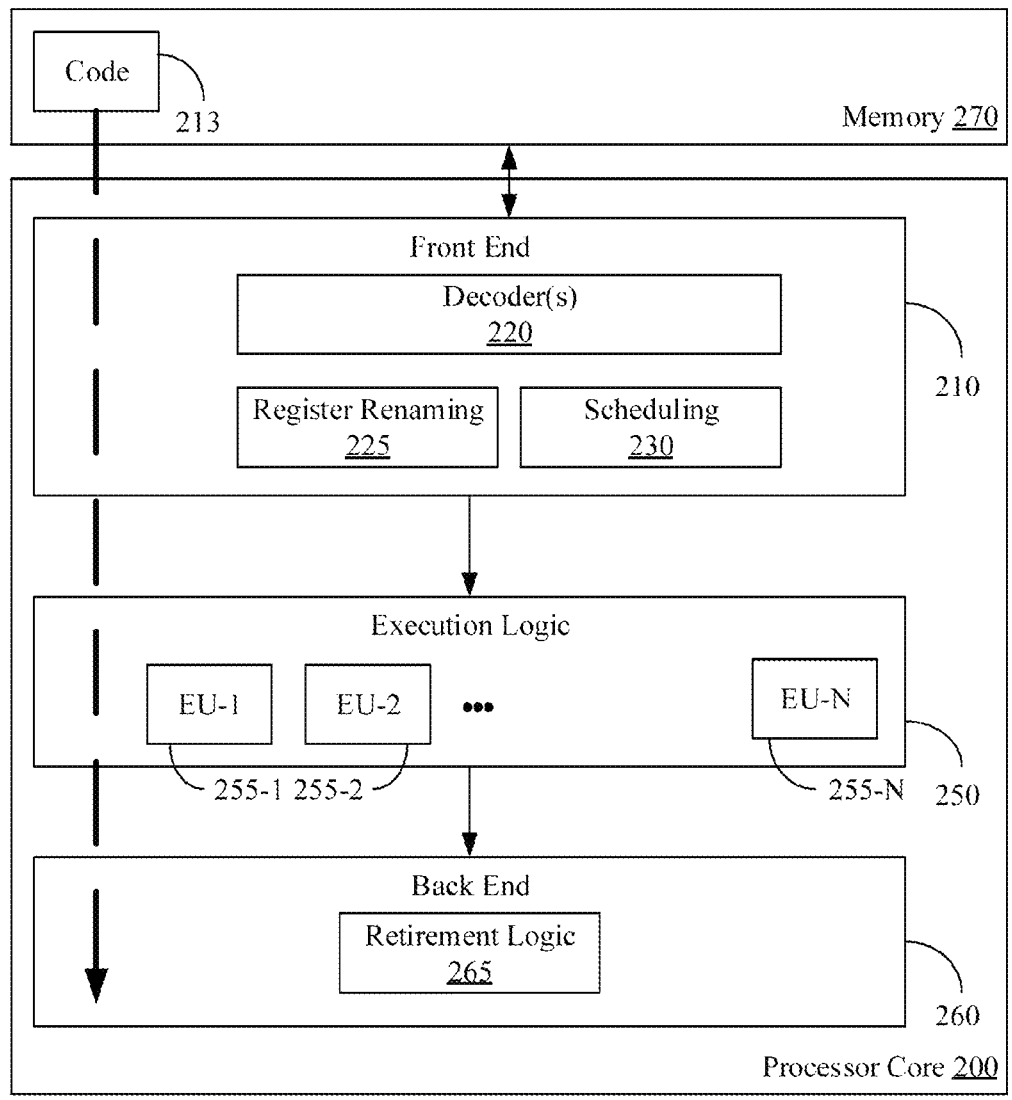
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIGS. 3A to 3C), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
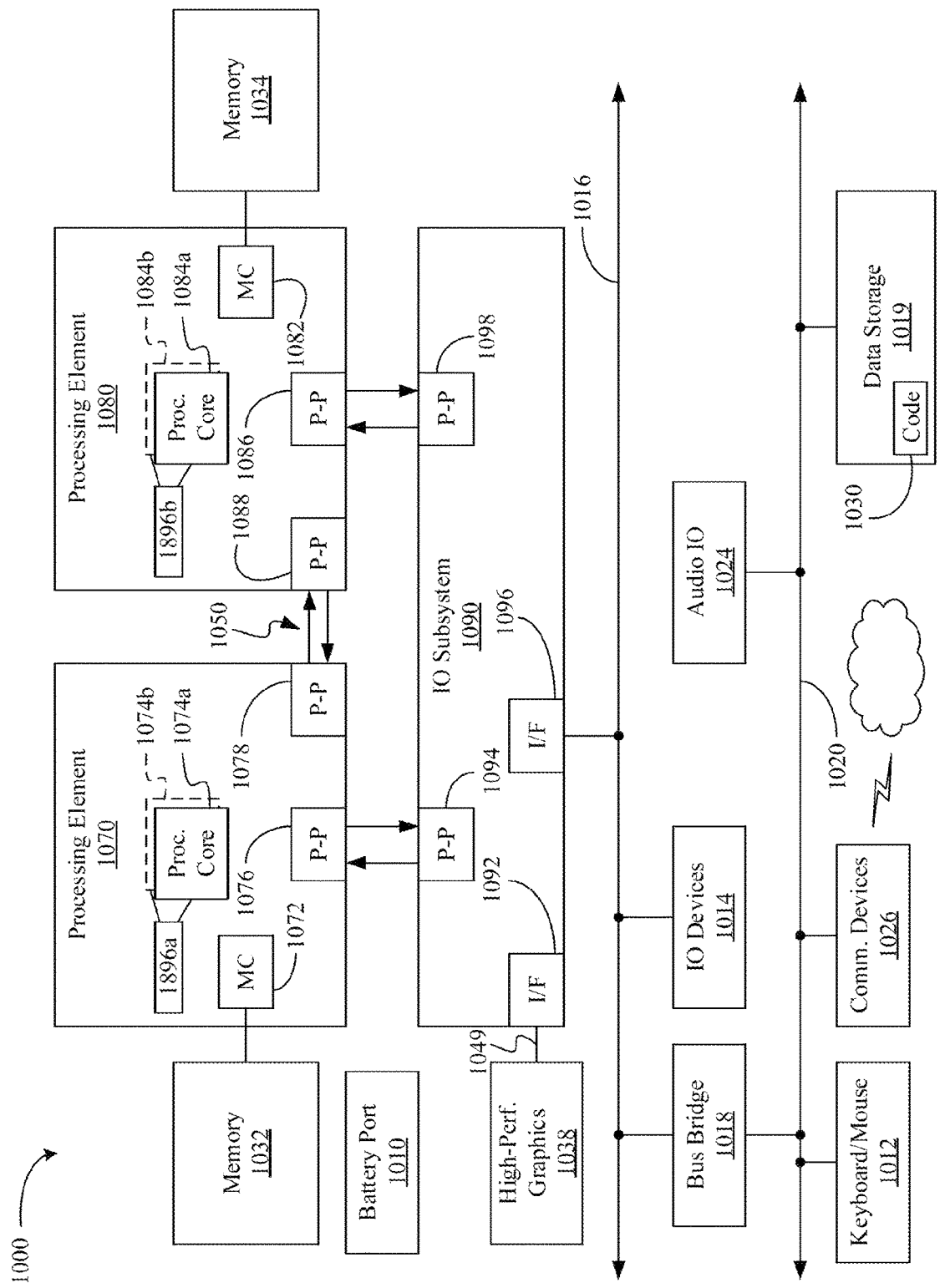
FIG. 8 is a block diagram of an example of a computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 7.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIGS. 3A to 3C), already discussed, and may be similar to the code 213 (FIG. 7), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Additional Notes and Examples

Example 1 may include an electronic processing system, comprising a processor, persistent storage media communicatively coupled to the processor, a reconfigurable device communicatively coupled to the processor over a physically isolated trusted communication channel, a secure provisioner communicatively coupled to the processor and the reconfigurable device to provision a secure storage area and to securely store a remotely generated bitstream security key in the provisioned secure storage area, and a device configurer to configure the reconfigurable device with a remotely generated bitstream and the remotely generated bitstream security key.

Example 2 may include the system of Example 1, wherein the secure provisioner is further to partition an enclave for the secure storage area, associate an enclave identifier with the enclave, and provide the enclave identifier to the reconfigurable device over the physically isolated trusted communication path.

Example 3 may include the system of Example 2, wherein the reconfigurable device comprises a field programmable gate array device and wherein the remotely generated bitstream is encoded with the enclave identifier and encrypted with the remotely generated bitstream security key.

Example 4 may include a configurable apparatus, comprising a configurable device, a secure provisioner communicatively coupled to the configurable device to provision a secure storage area and to securely store a remotely generated bitstream security key in the provisioned secure storage area, a secure communicator communicatively coupled to the configurable device and the secure provisioner to establish a trusted communication path between the provisioned secure storage area and the configurable device, and a device configurer communicatively coupled to the configurable device to configure the configurable device with a remotely generated bitstream and the remotely generated bitstream security key.

Example 5 may include the apparatus of Example 4, wherein the secure provisioner is further to partition an enclave for the secure storage area, associate an enclave identifier with the enclave, and provide the enclave identifier to the configurable device over the trusted communication path.

Example 6 may include the apparatus of Example 5, wherein the secure communicator is further to provide a physically isolated communication channel for the trusted communication path.

Example 7 may include the apparatus of Example 4, further including a source system to establish a secure communication channel between the source system and the secure provisioner, remotely generate a bitstream security key at the source system for the remotely generated bitstream security key, and provide the remotely generated bitstream security key to the secure provisioner over the secure communication channel.

Example 8 may include the apparatus of Example 7, wherein the source system further comprises a bitstream encoder to remotely encode the bitstream with the enclave identifier at the source system, and a bitstream encrypter to remotely encrypt the bitstream with the bitstream security key at the source system.

Example 9 may include the apparatus of any of Examples 4 to 8, wherein the configurable device comprises a reconfigurable device.

Example 10 may include the apparatus of Example 9, wherein the reconfigurable device comprises a field programmable gate array device.

Example 11 may include a method of configuring a device, comprising provisioning a secure storage area, securely storing a remotely generated bitstream security key in the provisioned secure storage area, establishing a trusted communication path between the provisioned secure storage area and a configurable device, and configuring the configurable device with a remotely generated bitstream and the remotely generated bitstream security key.

Example 12 may include the method of Example 11, further comprising partitioning an enclave for the secure storage area, associating an enclave identifier with the enclave, and providing the enclave identifier to the configurable device over the trusted communication path.

Example 13 may include the method of Example 12, further comprising providing a physically isolated communication channel for the trusted communication path.

Example 14 may include the method of Example 11, further comprising establishing a secure communication channel between a source system and the secure storage area, remotely generating a bitstream security key at the source system for the remotely generated bitstream security key, and providing the remotely generated bitstream security key to the secure storage area over the secure communication channel.

Example 15 may include the method of Example 14, further comprising remotely encoding the bitstream with the enclave identifier at the source system, and remotely encrypting the bitstream with the bitstream security key at the source system.

Example 16 may include the method of any of Examples 11 to 15, wherein the configurable device comprises a reconfigurable device.

Example 17 may include the method of Example 16, wherein the reconfigurable device comprises a field programmable gate array device.

Example 18 may include at least one computer readable medium, comprising a set of instructions, which when executed by a computing device cause the computing device to provision a secure storage area, securely store a remotely generated bitstream security key in the provisioned secure storage area, establish a trusted communication path between the provisioned secure storage area and a configurable device, and configure the configurable device with a remotely generated bitstream and the remotely generated bitstream security key.

Example 19 may include the at least one computer readable medium of Example 18, comprising a further set of instructions, which when executed by a computing device cause the computing device to partition an enclave for the secure storage area, associate an enclave identifier with the enclave, and provide the enclave identifier to the configurable device over the trusted communication path.

Example 20 may include the at least one computer readable medium of Example 19, comprising a further set of instructions, which when executed by a computing device cause the computing device to provide a physically isolated communication channel for the trusted communication path.

Example 21 may include the at least one computer readable medium of Example 18, comprising a further set of instructions, which when executed by a computing device cause the computing device to establish a secure communication channel between a source system and the secure storage area, remotely generate a bitstream security key at the source system for the remotely generated bitstream security key, and provide the remotely generated bitstream security key to the secure storage area over the secure communication channel.

Example 22 may include the at least one computer readable medium of Example 21, comprising a further set of instructions, which when executed by a computing device cause the computing device to remotely encode the bitstream with the enclave identifier at the source system, and remotely encrypt the bitstream with the bitstream security key at the source system.

Example 23 may include the at least one computer readable medium of any of Examples 18 to 22, wherein the configurable device comprises a reconfigurable device.

Example 24 may include the at least one computer readable medium of Example 23, wherein the reconfigurable device comprises a field programmable gate array device.

Example 25 may include a configuring apparatus, comprising means for provisioning a secure storage area, means for securely storing a remotely generated bitstream security key in the provisioned secure storage area, means for establishing a trusted communication path between the provisioned secure storage area and a configurable device, and means for configuring the configurable device with a remotely generated bitstream and the remotely generated bitstream security key.

Example 26 may include the apparatus of Example 25, further comprising means for partitioning an enclave for the secure storage area, means for associating an enclave identifier with the enclave, and means for providing the enclave identifier to the configurable device over the trusted communication path.

Example 27 may include the apparatus of Example 26, further comprising means for providing a physically isolated communication channel for the trusted communication path.

Example 28 may include the apparatus of Example 25, further comprising means for establishing a secure communication channel between a source system and the secure storage area, means for remotely generating a bitstream security key at the source system for the remotely generated bitstream security key, and means for providing the remotely generated bitstream security key to the secure storage area over the secure communication channel.

Example 29 may include the apparatus of Example 28, further comprising means for remotely encoding the bitstream with the enclave identifier at the source system, and means for remotely encrypting the bitstream with the bitstream security key at the source system.

Example 30 may include the apparatus of any of Examples 25 to 29, wherein the configurable device comprises a reconfigurable device.

Example 31 may include the apparatus of Example 30, wherein the reconfigurable device comprises a field programmable gate array device.

Embodiments are applicable for use with all types of semiconductor integrated circuit ("IC") chips. Examples of these IC chips include but are not limited to processors, controllers, chipset components, PLAs, memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and may no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
persistent storage media communicatively coupled to the processor;
a reconfigurable device communicatively coupled to the processor over a physically isolated trusted communication channel;
a secure provisioner communicatively coupled to the processor and the reconfigurable device to provision a secure storage area and to securely store a remotely generated bitstream security key in the provisioned secure storage area, wherein the secure provisioner is further to:
partition an enclave for the secure storage area;
associate an enclave identifier with the enclave; and
provide the enclave identifier to the reconfigurable device over the physically isolated trusted communication channel; and
a device configurer to configure the reconfigurable device with a remotely generated bitstream and the remotely generated bitstream security key, wherein the remotely generated bitstream is to be encoded with the enclave identifier and encrypted with the remotely generated bitstream security key, wherein the remotely generated bitstream and the remotely generated bitstream security key are obtained by the secure provisioner via a secure communication channel and provided over the physical isolated trusted communication channel to configure the reconfigurable device.

2. The system of claim 1, further comprising a source system to:
establish the secure communication channel between the source system and the secure provisioner;
remotely generate a bitstream security key at the source system for the remotely generated bitstream security key; and
provide the remotely generated bitstream security key to the secure provisioner over the secure communication channel.

3. A configurable apparatus, comprising:
a configurable device;
a secure provisioner communicatively coupled to the configurable device to provision a secure storage area and to securely store a remotely generated bitstream security key in the provisioned secure storage area;
a secure communicator communicatively coupled to the configurable device and the secure provisioner to establish a physically isolated trusted communication path between the provisioned secure storage area and the configurable device, wherein the secure provisioner is further to:
partition an enclave for the secure storage area;
associate an enclave identifier with the enclave; and
provide the enclave identifier to the reconfigurable device over the physically isolated trusted communication path; and
a device configurer communicatively coupled to the configurable device to configure the configurable device with a remotely generated bitstream and the remotely generated bitstream security key, wherein the remotely generated bitstream is to be encoded with the enclave identifier and encrypted with the remotely generated bitstream security key, wherein the remotely generated bitstream and the remotely generated bitstream security key are obtained by the secure provisioner via a secure communication channel and provided over the physical isolated trusted communication path to configure the configurable device.

4. The apparatus of claim 3, further including a source system to:
establish the secure communication channel between the source system and the secure provisioner;
remotely generate a bitstream security key at the source system for the remotely generated bitstream security key; and
provide the remotely generated bitstream security key to the secure provisioner over the secure communication channel.

5. The apparatus of claim 4, wherein the source system further comprises:
a bitstream encoder to remotely encode the bitstream with the enclave identifier at the source system; and a bitstream encrypter to remotely encrypt the bitstream with the bitstream security key at the source system.

6. The apparatus of claim 3, wherein the configurable device comprises a reconfigurable device.

7. The apparatus of claim 6, wherein the reconfigurable device comprises a field programmable gate array device.

8. A method of configuring a device, comprising:
provisioning a secure storage area;
securely storing a remotely generated bitstream security key in the provisioned secure storage area;
establishing a physically isolated trusted communication path between the provisioned secure storage area and a configurable device, including:
partitioning an enclave for the secure storage area;
associating an enclave identifier with the enclave; and
providing the enclave identifier to the configurable device over the physically isolated trusted communication path; and
configuring the configurable device with a remotely generated bitstream and the remotely generated bitstream security key, wherein the remotely generated bitstream is to be encoded with the enclave identifier and encrypted with the remotely generated bitstream security key, wherein the remotely generated bitstream and the remotely generated bitstream security key are obtained by the provisioned secure storage area via a secure communication channel and provided over the physical isolated trusted communication path to configure the configurable device.

9. The method of claim 8, further comprising:
establishing the secure communication channel between a source system and the provisioned secure storage area;
remotely generating a bitstream security key at the source system for the remotely generated bitstream security key; and
providing the remotely generated bitstream security key to the provisioned secure storage area over the secure communication channel.

10. The method of claim 9, further comprising: remotely encoding the bitstream with the enclave identifier at the source system; and
remotely encrypting the bitstream with the bitstream security key at the source system.

11. The method of claim 8, wherein the configurable device comprises a reconfigurable device.

12. The method of claim 11, wherein the reconfigurable device comprises a field programmable gate array device.

13. At least one non-transitory computer readable medium, comprising a set of instructions, which when executed by a computing device cause the computing device to:
provision a secure storage area;
securely store a remotely generated bitstream security key in the provisioned secure storage area;
establish a physically isolated trusted communication path between the provisioned secure storage area and a configurable device, including:
partition an enclave for the secure storage area;
associate an enclave identifier with the enclave; and
provide the enclave identifier to the configurable device over the physically isolated trusted communication path; and
configure the configurable device with a remotely generated bitstream and the remotely generated bitstream security key, wherein the remotely generated bitstream is to be encoded with the enclave identifier and encrypted with the remotely generated bitstream security key, wherein the remotely generated bitstream and the remotely generated bitstream security key are obtained by the provisioned secure storage area via a secure communication channel and provided over the physical isolated trusted communication path to configure the configurable device.

14. The at least one non-transitory computer readable medium of claim 13, comprising a further set of instructions, which when executed by a computing device cause the computing device to:
establish the secure communication channel between a source system and the provisioned secure storage area;
remotely generate a bitstream security key at the source system for the remotely generated bitstream security key; and
provide the remotely generated bitstream security key to the provisioned secure storage area over the secure communication channel.

15. The at least one non-transitory computer readable medium of claim 14, comprising a further set of instructions, which when executed by a computing device cause the computing device to:
remotely encode the bitstream with the enclave identifier at the source system; and
remotely encrypt the bitstream with the bitstream security key at the source system.

16. The at least one non-transitory computer readable medium of claim 13, wherein the configurable device comprises a reconfigurable device.

17. The at least one non-transitory computer readable medium of claim 16, wherein the reconfigurable device comprises a field programmable gate array device.

* * * * *